United States Patent
Fujioka

(10) Patent No.: US 9,332,236 B2
(45) Date of Patent: May 3, 2016

(54) IMAGE PROJECTION APPARATUS AND METHOD OF CONTROLLING LIGHT SOURCE

(75) Inventor: Nobuhide Fujioka, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 329 days.

(21) Appl. No.: 14/002,095

(22) PCT Filed: Mar. 3, 2011

(86) PCT No.: PCT/JP2011/054870
§ 371 (c)(1),
(2), (4) Date: Aug. 28, 2013

(87) PCT Pub. No.: WO2012/117548
PCT Pub. Date: Sep. 7, 2012

(65) Prior Publication Data
US 2013/0335642 A1 Dec. 19, 2013

(51) Int. Cl.
*H04N 9/31* (2006.01)
*G03B 21/20* (2006.01)
*G03B 33/12* (2006.01)

(52) U.S. Cl.
CPC ............. *H04N 9/31* (2013.01); *G03B 21/2033* (2013.01); *G03B 33/12* (2013.01); *H04N 9/3155* (2013.01); *H04N 9/3161* (2013.01)

(58) Field of Classification Search
CPC ........... G03B 21/2033; G03B 21/5033; G03B 21/2086; H04N 9/3161; H04N 9/3155; H04N 9/3194; H04N 9/3197
USPC .......... 353/31, 37, 38, 69, 70, 98, 121; 372/8, 372/29.01, 29.014, 29.015, 38.1
See application file for complete search history.

(56) References Cited

U.S. PATENT DOCUMENTS

2009/0051827 A1*  2/2009  Yokoyama ............. G03B 21/00
                                                          348/744
2009/0244497 A1   10/2009  Tanaka et al.
(Continued)

FOREIGN PATENT DOCUMENTS

CN        1438510 A       8/2003
CN      101243357 A       8/2008
(Continued)

OTHER PUBLICATIONS

Chinese Office Action and Search Report dated Nov. 21, 2014 with a partial English translation thereof.
(Continued)

*Primary Examiner* — Sultan Chowdhury
(74) *Attorney, Agent, or Firm* — McGinn IP Law Group PLLC

(57) ABSTRACT

To control a laser used as a light source according to an input image, while satisfying a safety standard, a projector includes lasers provided for each of a plurality of colors, a dichroic mirror that synthesizes laser beams emitted by the lasers, an LCOS panel that modulates light by the dichroic mirror, and a projection lens that projects the light modulated by the LCOS panel. A processor determines rate of power of the laser beams according to the image signal, determines, according to the rate of the power, an upper limit value of the power of the projected laser beam in each color to the extent that the upper limit value satisfies a safety standard, and adjusts the laser beam in each color emitted by the corresponding laser so as to prevent the projected light beam in each color from exceeding the upper limit value.

8 Claims, 7 Drawing Sheets

(56) References Cited

U.S. PATENT DOCUMENTS

| | | | |
|---|---|---|---|
| 2009/0262262 A1 | 10/2009 | Itoh et al. | |
| 2011/0199587 A1* | 8/2011 | Katou | G03B 21/14 353/85 |
| 2012/0218525 A1* | 8/2012 | Kwon | H04N 9/3135 353/85 |
| 2014/0036235 A1* | 2/2014 | Chang | G03B 21/2053 353/31 |

FOREIGN PATENT DOCUMENTS

| | | |
|---|---|---|
| JP | 2002-214706 A | 7/2002 |
| JP | 2004-234001 A | 8/2004 |
| JP | 2009-116163 A | 5/2009 |
| JP | 2009-244633 A | 10/2009 |
| JP | 2010-044204 | 2/2010 |
| JP | 4507506 B2 | 7/2010 |
| WO | WO 2007/023916 A1 | 3/2007 |

OTHER PUBLICATIONS

International Search Report dated Apr. 26, 2011 in PCT/JP2011/054870, with English translation thereof.

\* cited by examiner

IMAGE PROJECTION APPARATUS AND METHOD OF CONTROLLING LIGHT SOURCE

BACKGROUND OF THE INVENTION

1. Technical Field

The present invention relates to an image projection apparatus and a method of controlling a light source, and in particular, to an image projection apparatus and a method of controlling a light source in which a laser is used as the light source.

2. Background Art

In recent years, projectors using a laser as a light source has been actively developed. The laser used as a light source is better than a lamp, as a light source, in the following respects. The size and weight of the light source itself can be easily reduced. Projection efficiency can be enhanced due to the small etendue of the laser. The light source itself can achieve increased emission efficiency. The laser exhibits high monochromaticity and thus enables color reproducibility to be enhanced. The laser eliminates the need for mercury, which is a hazardous substance.

As projectors that use a laser as a light source, small portable projectors with a brightness of about 10 lumens have been implemented. However, projectors with a brightness of about 10 lumens have difficulty allowing a further increase in the size of a projection screen while providing sufficient contrast when the surroundings of the projector are bright. Thus, for further increased projector brightness, development of a laser used as a light source and having an increased output level has been promoted.

On the other hand, when the laser is used as a light source, a laser safety standard needs to be satisfied which is specified in IEC (International Electrotechnical Commission) 60825-1, which is an international standard. IEC 60825-1 specifies an accessible emission limit (AEL) that is a laser safety standard for each of a plurality of laser classes 1, 2, 3R, and 3B. The accessible emission limit refers to the maximum accessible emission level of laser light that is permissible for each laser class according to the wavelength of the laser light and the emission duration of the laser light.

Thus, for projectors using a laser as a light source, the laser class also needs to be determined in accordance with the provision in IEC 60825-1. Furthermore, the maximum amount of luminous flux that can be projected by the projector can also be determined using the AEL value for each laser class. For example, the small portable projectors are roughly classified into a scan type that sequentially projects an image on a pixel-by-pixel basis and an LCOS type that projects all the pixels of the image when using an LCOS (Liquid-Crystal-On-Silicon) element, and it has been found that, for the same laser class 1 or 2, the LCOS projector has a larger maximum amount of projectable luminous flux than the scan type. This is because, for example, the LCOS type takes a longer image projection time than the scan type.

Hence, the LCOS projector can make the projection screen brighter than the scan projector. If a small LCOS projector is produced using a commercially available laser, this projector is roughly classified as laser class 1 or 2.

As described above, to improve brightness of the projector, development of a laser with an increased output level is being promoted. Even LCOS projectors are likely to be implemented which are classified in a laser class 3R or higher. In such as case, it is expected that the projector is designed so as to be classified as a predetermined laser class. Patent Literature 1 discloses a design technique for a projector that satisfies the safety standard for laser light sources. Moreover, the light source needs to be controlled such that the power of laser light emitted by the light source decreases to a value smaller than a rated value, so as to allow the laser class of the projector to be classified in a predetermined laser class.

RELATED ART LITERATURE

Patent Literature

Patent Literature 1: JP2009-116163A

DISCLOSURE OF THE INVENTION

The accessible emission limit AEL specified in IEC 60825-1 varies depending on operating conditions for the laser used as a light source.

In general, a projector that uses a laser exhibits the maximum accessible emission level when projecting a white image. Hence, the power of laser light emitted by the light source is set so as not to exceed AEL for the predetermined laser class when a white image is projected. However, for a projector in which the light source emits laser light with a given power for a given turn-on time without depending on an input image, it is difficult to prevent the light source from consuming power. Furthermore, since the operating conditions for the laser do not vary depending on the input image, if an image in red or if the like is projected, it is difficult to increase the brightness of the image by making the power of a laser beam in a particular color emitted by the light source higher than the power of the laser beam in the same color for a white image.

On the other hand, for a projector in which the operating conditions for the laser vary depending on the input image, accessible emission limit AEL varies depending on the operating conditions for the laser, and thus, the accessible emission level of the projector may disadvantageously exceed AEL for a predetermined laser class.

An object of the present invention is to provide an image projection apparatus and a method of controlling a light source in which a laser that is used as the light source is controlled according to an input image, with the safety standard for laser light always satisfied.

SUMMARY OF THE INVENTION

An image projection apparatus according to the present invention includes light sources provided for each of a plurality of colors to emit a laser beam in each color, a synthesis element that synthesizes laser beams in each color emitted by the light sources for each color, an optical modulation element that modulates synthesized light resulting from the synthesis by the synthesis element according to an image signal, a projection lens that projects the synthesized light modulated by the optical modulation element, and a controller that, upon receiving the image signal, determines rate of power of laser beams in each color emitted by the light sources for each color, according to the image signal, determines, according to the rate of the power, an upper limit value of the power of the projected laser beam in each color to the extent that the upper limit value satisfies a safety standard for the laser beam, and adjusts the laser beam in each color emitted by the light source so as to prevent the projected light beam in each color projected by the projection lens from exceeding the upper limit value.

A method of controlling a light source according to the present invention is a method of controlling a light source for an image projection apparatus including light sources provided for each of a plurality of colors to emit a laser beam in the color, a synthesis element that synthesizes laser beams in each color emitted by the light sources for each color, an optical modulation element that modulates synthesized light resulting from the synthesis by the synthesis element according to an image signal, and a projection lens that projects the synthesized light modulated by the optical modulation element, the method including, upon receiving the image signal, determining rate of power of laser beams in each color emitted by the light sources for each color, according to the image signal, determining, according to the rate of the power, an upper limit value of the projected power of the laser beam in each color to the extent that the upper limit value satisfies a safety standard for the laser beam, and adjusting the laser beam in each color emitted by the light source so as to prevent the projected light beam in each color projected by the projection lens from exceeding the upper limit value.

Advantageous Effect of the Invention

The present invention can satisfy the safety standard for laser light while preventing a laser that is used as a light source from consuming power.

BRIEF DESCRIPTION OF THE DRAWINGS

FIG. 7 is a diagram showing a period in which lasers in each color are simultaneously turned on.

FIG. 8 is a diagram showing a period when the laser in each color is independently turned on and a period when the lasers in each color are simultaneously turned on.

EXEMPLARY EMBODIMENT

Exemplary embodiments will be described below with reference to the drawings.

Figure 1:
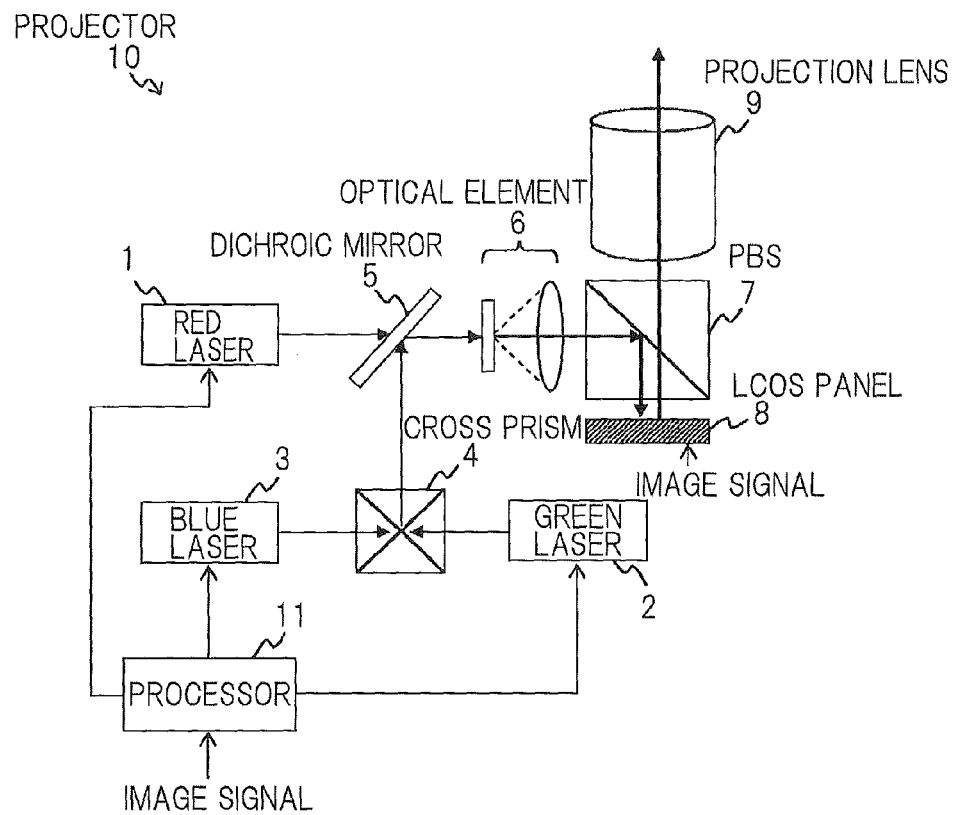
FIG. 1 is a diagram showing an example of a configuration of an image projection apparatus according to a first exemplary embodiment.

FIG. 1 is a block diagram showing a projector according to a first exemplary embodiment.

Projector 10 is an LCOS image projection apparatus. Projector 10 includes red laser 1, green laser 2, blue laser 3, cross prism 4, dichroic mirror 5, optical element 6, polarizing beam splitter (PBS) 7, LCOS panel 8, projection lens 9, and processor 11.

Red laser 1 is a light source that emits a red laser beam within each frame period. The frame period is sometimes referred to as a predetermined period. Red laser 1 is implemented by, for example, a laser diode (LD: Laser Diode).

Green laser 2 is a light source that emits a green laser beam within each frame period. Green laser 2 is implemented by, for example, a laser using SHG (Second Harmonic Generation) or a laser diode.

Blue laser 3 is a light source that emits a blue laser beam within each frame period. Blue laser 3 is implemented by, for example, a laser diode.

Cross prism 4 synthesizes the laser beam emitted by blue laser 3 and the laser beam emitted by green laser 2 and outputs the resultant synthesized light to dichroic mirror 5.

Dichroic mirror 5 can generally be referred to as a synthesis element.

Dichroic mirror 5 synthesizes the laser beams in each color emitted by lasers 1 to 3 for each color. In the first exemplary embodiment, dichroic mirror 5 synthesizes light output by cross prism 4 and the laser beam emitted by red laser 1 and outputs the resultant synthesized light to optical element 6.

Optical element 6 shapes the beam profile of the synthesized light output by dichroic mirror 5 and outputs the resultant synthesized light to polarizing beam splitter 7. Optical element 6 includes, for example, a diffractive optical element and a field lens.

Polarizing beam splitter 7 is used to adjust the polarization direction of the synthesized light output by optical element 6 to a polarization axis of LCOS panel 8. Polarizing beam splitter 7 irradiates LCOS panel 8 with the synthesized light with the polarization direction adjusted to the polarization axis of LCOS panel 8.

LCOS panel 8 can generally be referred to as an optical modulation element.

LCOS panel 8 is a liquid crystal panel that, upon receiving an image signal indicative of an image from processor 11, modulates the synthesized light resulting from the synthesis by dichroic mirror 5 according to the image signal. According to the first exemplary embodiment, LCOS panel 8 modulates the synthesized light emitted by polarizing beam splitter 7 according to the image signal. LCOS panel 8 outputs the modulated synthesized light to projection lens 9 via polarizing beam splitter 7.

Projection lens 9 projects the synthesized light modulated by LCOS panel 8. According to the first exemplary embodiment, projection lens 9 projects the modulated synthesized light output by polarizing beam splitter 7, on a screen as an image.

Processor 11 can generally be referred to as a controller.

Processor 11 stores AEL information needed to calculate accessible emission limit AEL that is a safety standard for laser light, for each laser class specified in IEC 60825-1.

Upon receiving an image signal as an input image, processor 11 determines, according to the image signal, the ratio of the power of the laser beams in each color emitted by lasers 1 to 3 in each color, and determines, according to the ratio of the power, the upper limit value of the power of projected light in each color such that accessible emission limit AEL is satisfied. Processor 11 adjusts the laser beams emitted by lasers 1 to 3 so as to prevent the power of the projected light in each color projected by projection lens 9 from exceeding the upper limit value.

According to the first exemplary embodiment, processor 11 uses the ratio of the power of the laser beams in each color and the upper limit value of each color to calculate the turn-on time for the laser beam in each color within the frame period.

The first exemplary embodiment uses, as the turn-on time, a turn-on duty ratio equal to the frame period divided by the turn-on time.

For the laser beam in each color, processor 11 calculates the lighting intensity of the laser beam by dividing the power of the laser beam by the turn-on time for the laser beam. The lighting intensity is also referred to as a peak power (power density).

Processor 11 controls each of lasers 1 to 3 for each color so that the laser emits a laser beam with the calculated lighting intensity for the calculated turn-on time. Specifically, processor 11 provides each of lasers 1 to 3 for each color with a control signal indicative of the corresponding turn-on time and lighting intensity to adjust the laser beams emitted by lasers 1 to 3 for each color.

The first exemplary embodiment has been described in conjunction with the example in which LCOS panel 8 is used as an optical modulation element for projector 10. However, DLP (Digital Light Processing) may be used instead of LCOS panel 8.

Figure 2:
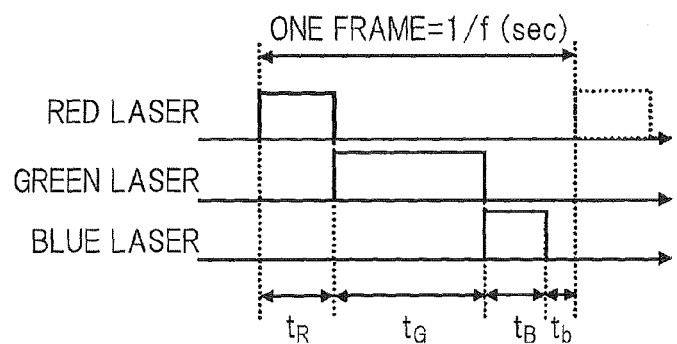
FIG. 2 is a diagram showing emission timings for laser beams in each color.

FIG. 2 is a diagram showing turn-on timings for lasers 1 to 3 for each color.

FIG. 2 shows turn-on time $t_R$ for red laser 1, turn-on time $t_G$ for green laser 2, turn-on time $t_B$ for blue laser 3, and blanking time $t_b$ which are all included in one frame period (1/f).

As shown in FIG. 2, laser beams are emitted in the following order within one frame period: red laser 1, green laser 2, and blue laser 3. That is, lasers 1 to 3 emit laser beams at different timings. Furthermore, the laser beam from each of lasers 1 to 3 for each color has a constant lighting intensity (peak power) within the turn-on period. Additionally, one frame period is expressed by Formula 1. In the formula, f denotes a frame rate.

[Formula 1]

$$t_R+t_G+t_B+t_b=1/f \qquad \text{formula 1}$$

Now, a method for determining the laser class of projector 10 will be described.

Figure 3:
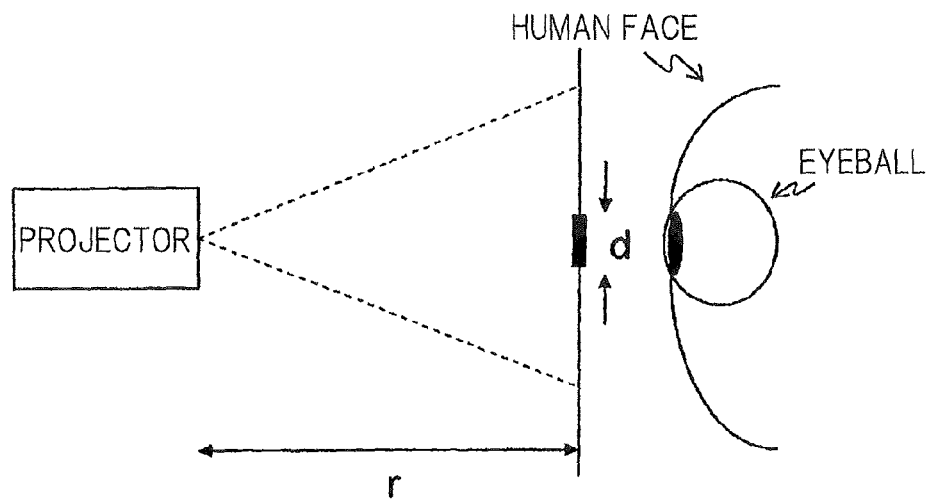
FIG. 3 is a diagram showing a configuration for measurement of an accessible emission level.

FIG. 3 is a diagram showing a configuration for measurement of the accessible emission level illustrated in IEC 60825-1. FIG. 3 assumes that synthesized light projected by the projector (hereinafter referred to as "projected light") enters a human being's pupil and that the projected light is then coupled onto the retina.

The determination of the laser class involves comparing an accessible emission level $E_{aperture}$ measured by the configuration shown in FIG. 3 with accessible emission limit AEL for each laser class specified in IEC 60825-1. Then, accessible emission limit AEL that satisfies Formula 2 is identified. The laser class with the accessible emission limit is determined to be the laser class of projector 10.

[Formula 2]

$$E_{aperture}<AEL \qquad \text{formula 2}$$

Furthermore, the relation between total power $P_{image}$ of the projected light and accessible emission level $E_{aperture}$ is expressed by Formula 3.

[Formula 3]

$$E_{aperture}=\eta P_{image} \qquad \text{formula 3}$$

In Formula 3, η is a coefficient determined by projector 10 and the configuration for the measurement of accessible emission level $E_{aperture}$ and which is smaller than 1.

Formula 3 indicates that accessible emission level $E_{aperture}$ has a proportional relation with total power $P_{image}$ of the projected light. Moreover, Formula 4 is obtained using Formula 2 and Formula 3.

[Formula 4]

$$P_{image}=AEL \cdot \eta^{-1} \qquad \text{formula 4}$$

As shown in Formula 4, predetermining coefficient η allows the laser class of projector 10 to be determined by determining total power $P_{image}$ of the projected light. Moreover, when the laser class of projector 10 is adjusted to a predetermined laser class, total power $P_{image}$ of the projected light needs to be smaller than the value of the right side of Formula 4.

Next, accessible emission limit AEL used to determine the laser class will be described.

In projector 10, the laser beams in each color emitted by red laser 1, green laser 2, and blue laser 3 are sequentially turned on in a time division manner as shown in FIG. 2. Hence, red laser 1, green laser 2, and blue laser 3 correspond to repetitively pulsed lasers and modulation lasers. Three types of accessible emission limits AEL are specified for the safety standard for repetitively pulsed lasers and modulation lasers. In this case, the most strictly conditioned AEL of the three types of AELs is used.

Furthermore, the laser beams in each color have different wavelengths. Thus, $AEL_R$ of the red laser beam, $AEL_G$ of the green laser beam, and $AEL_B$ of the blue laser beam have different values. Thus, projector 10 needs to satisfy Formula 5 in accordance with the laser class.

[Formula 5]

$$E_{aperture,R}<AEL_R, E_{aperture,G}<AEL_G, E_{aperture,B}<AEL_B \qquad \text{formula 5}$$

Furthermore, projector 10 synthesizes the laser beams in each color for projection and thus needs to take the overlap of the laser beams in each color into account. Hence, Formula 6 needs to be satisfied.

[Formula 6]

$$\frac{E_{aperture,R}}{AEL_R} + \frac{E_{aperture,G}}{AEL_G} + \frac{E_{aperture,B}}{AEL_B} < 1 \qquad \text{formula 6}$$

In comparison between Formula 5 and Formula 6, Formula 6 expresses a stricter condition than Formula 5, and thus, the laser class is determined using Formula 6. Total power $P_{image}$ of the projected light is expressed by formula 7 using the accessible emission levels ($E_{aperture,R}$, $E_{aperture,G}$, and $E_{aperture,B}$) of the laser beams in the each color which satisfy Formula 6.

[Formula 7]

$$P_{image}=(E_{aperture,R}+E_{aperture,G}+E_{aperture,B}) \cdot \eta^{-1} \qquad \text{formula 7}$$

As described above, since accessible emission limit AEL is specified for each laser class, the laser class of projector 10 is determined using Formula 6 for each AEL of the laser class.

Now, AEL of the laser class 2 will be described in view of the increased brightness of recent small portable projectors.

In projector 10, red laser 1 emits a laser beam with a wavelength of about 640 nm. The green laser 2 emits a laser beam with a wavelength of about 530 nm. The blue laser 3 emits a laser beam with a wavelength of about 445 nm.

Furthermore, one frame period is "3.33 ms". The turn-on time (pulse width) of each of red laser 1, green laser 2, and blue laser 3 within one frame period is set based on the turn-on duty ratio. The first exemplary embodiment sets the turn-on duty ratio to a value larger than 0.5% (turn-on time: 18 μs).

$AEL_{single}$ of a single pulse applied to a laser light source with a turn-on time (accessible emission time) of 18 μs to 10 s is expressed by:

[Formula 8]

$$AEL_{single}=7\times10^{-4}t^{0.75}C_6[J] \qquad \text{formula 8}$$

In Formula 8, t denotes the turn-on time (for example, $t_R$, $t_G$, or $t_B$) for the laser, and $C_6$ denotes a correction coefficient that depends on the visual angle of the laser used as a light source.

Furthermore, a time reference corresponding to the wavelength region of the laser beam in each color defined for the laser class 2 is "0.25 s". Thus, $AEL_{s.p.T}$ for a single pulse within the reference time of 0.25 s is expressed by:

[Formula 9]

$$AEL_{s.p.T}=C_6\times10^{-3}[W] \qquad \text{formula 9}$$

Moreover, $AEL_{s.p.train}$ obtained by multiplying $AEL_{single}$ by correction coefficient $C_5$ is expressed by:

[Formula 10]

$$AEL_{s.p.train}=AEL_{single}\cdot C_5[J] \qquad \text{formula 10}$$

In Formula 10, $C_5$ denotes a correction coefficient calculated by raising number N (a value of 1 or larger) of pulses contained in a pulse train within the reference time of 0.25 s, to the −0.25th power. Then, $AEL_{s.t.train}$ is converted into the average power of the pulse train. In this case, one pulse is assigned to one frame period for each laser beam, and thus, frame rate f is equal to the repetitive frequency of lasers 1 to 3. Thus, the converted $AEL_{s.t.train}$ is expressed by:

[Formula 11]

$$AEL_{s.p.train} = 7\times10^{-4}t^{0.75}C_6\cdot N^{-0.25}\cdot f$$
$$= C_6\cdot 0.99\times10^{-3}\cdot(f\cdot t)^{0.75}[W] \qquad \text{formula 11}$$

In this case, N=0.25f, f×t represents the turn-on duty ratio, which is not more than 1.

A comparison between Formula 8 and Formula 10 indicates that since number N of pulses in Formula 10 has a value of 1 or larger, $AEL_{s.p.train}$ is smaller than $AEL_{single}$. Moreover, a comparison between Formula 9 and Formula 11 indicates that since (f×t) in Formula 11 has a value of 1 or smaller, $AEL_{s.p.train}$ is smaller than $AEL_{s.p.T}$. Thus, $AEL_{s.p.train}$ in the most strictly conditioned Formula 11 is used to determine the laser class.

In the determination of the laser class, AEL is determined depending on the turn-on conditions for lasers 1 to 3 for each color. Hence, $AEL_R$, $AEL_G$, and $AEL_B$ that correspond to the turn-on conditions for lasers 1 to 3 in each color shown in FIG. 2 are expressed by:

[Formula 12]

$$AEL_R=C_6\cdot 0.99\times10^{-3}\cdot(f\cdot t_R)^{0.75}[W]$$

$$AEL_G=C_6\cdot 0.99\times10^{-3}\cdot(f\cdot t_G)^{0.75}[W]$$

$$AEL_B=C_6\cdot 0.99\times10^{-3}\cdot(f\cdot t_B)^{0.75}[W] \qquad \text{formula 12}$$

The laser class can be determined by further substituting $AEL_R$, $AEL_G$, and $AEL_B$ in Formula 12 into Formula 6. Furthermore, the maximum power of laser light that can be projected at the laser class 2 can be calculated.

Now, the upper limit value of the power of projected light that can be projected by projector 10 that corresponds to the laser class 2 will be described.

The ratio of the power of projected light beams in each color is often set such that the light beams in each color are mixed into white. Thus, projector 10 allows lasers 1 to 3 for each color to emit laser beams in the ratio ($m_R$:$m_G$:$m_B$) of the power of the projected light beams in each color in which the light beams are mixed into white. Furthermore, $m_R+m_G+m_B=1$.

Additionally, the power of the projected light and the accessible emission level have a proportional relation as shown in Formula 3, and thus, the ratio of the accessible emission levels of the laser beams in each color is $m_R$:$m_G$:$m_B$. Hence, when the accessible emission levels of the laser beams in each color are expressed as $E_R=\gamma\times m_a$, $E_G=\gamma\times m_G$, and $E_B=\gamma\times m_B$, Formula 6 is expressed by:

[Formula 13]

$$\frac{E_R}{AEL_R}+\frac{E_G}{AEL_G}+\frac{E_B}{AEL_B}=\left(\frac{m_R}{AEL_R}+\frac{m_G}{AEL_G}+\frac{m_B}{AEL_B}\right)\cdot\gamma<1 \qquad \text{formula 13}$$

Here, γ that sets the left side of Formula 13 to 1 is defined as $\gamma_{max}$. The value $\gamma_{max}$ is maximized by combining $AEL_R$, $AEL_G$, and $AEL_B$ which minimizes the value in the brackets in the left side of Formula 13. The upper limit values ($E_{Rmax}=\gamma_{max}\times m_R$, $E_{Gmax}=\gamma_{max}\times m_G$, $E_{Bmax}=\gamma_{max}\times m_B$) of the accessible emission levels of each color are determined to the extent that AELs of each color are satisfied. Thus, the upper limit values ($P_{Rmax}=\eta^{-1}\times E_{Rmax}$, $P_{Gmax}=\eta^{-1}\times E_{Gmax}$, and $P_{Bmax}=\eta^{-1}\times E_{Bmax}$) of the power of the projected light beams in each color are determined to the extent that AELs are satisfied.

The combination of $AEL_R$, $AEL_G$, and $AEL_B$ which maximizes $\gamma_{max}$ is obtained by the conditions for maximizing $C_6$ in Formula 12 and the optimum combination of the turn-on duty ratio for each color.

$C_6$ is a correction coefficient determined by the visual angle of the laser and having a value which depends on an optical design and which is common to lasers 1 to 3 for each color.

On the other hand, the turn-on duty ratio for each color can be optionally set for lasers 1 to 3 for each color, and the appropriate combination of the turn-on duty ratio is present according to $m_R$:$m_G$:$m_B$.

An example of calculating the appropriate combination of the turn-on duty ratio for each color will be described.

Figure 4:
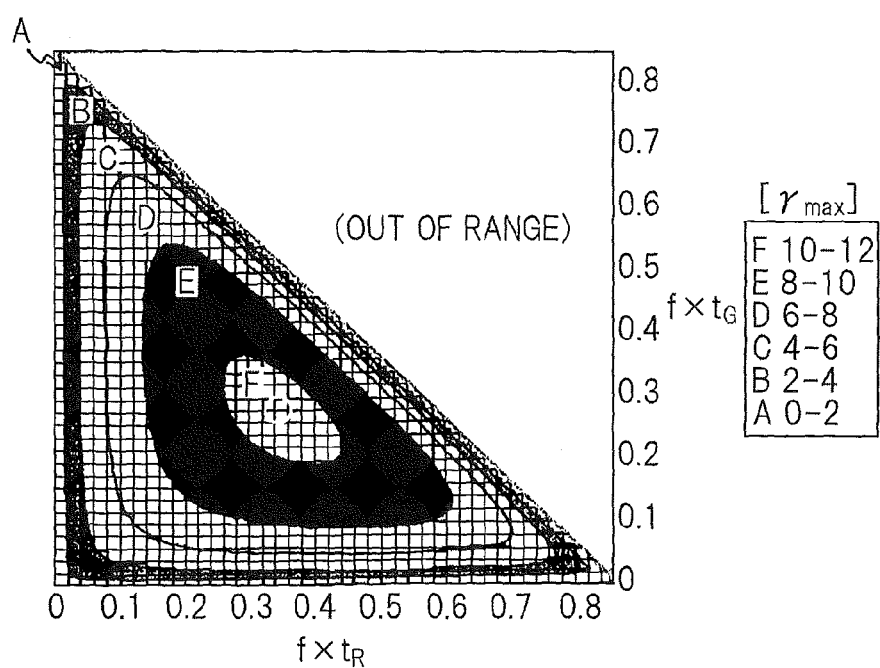
FIG. 4 is a diagram showing $\gamma_{max}$ that varies depending on a turn-on duty ratio.

FIG. 4 is a diagram showing $\gamma_{max}$ that varies depending on the turn-on duty ratio. FIG. 4 shows the possible value of $\gamma_{max}$ with respect to $t_R$ and $t_G$. $t_B$ is uniquely determined by $t_R$ and $t_G$ and thus omitted.

In FIG. 4, the laser beams in each color have wavelengths of 640 nm, 530 nm, and 445 nm, respectively. Hence, the ratio of the power of the projected light beams in each color which expresses white (x, y)=(0.3127, 0.3290) is (0.473:0.310:0.217).

Furthermore, correction coefficient $C_6$ is assumed to be "26.3". Correction coefficient $C_6$=26.3 corresponds to the visual angle of the light source α=40 mrad. Moreover, the sum of the turn-on duty ratio for each color is assumed to be 0.85 (=f×($t_R$+$t_G$+$t_B$)). A blanking duty ratio is "0.15".

As shown in FIG. 4, the value of $\gamma_{max}$ varies depending on the combination of the turn-on duty ratio for each color. FIG. 4 shows that the optimum combination of the turn-on duty ratio for each color (f×$t_R$, f×$t_G$, f×$t_B$) which sets $\gamma_{max}$ to a maximum value of 10.3 mW is in the neighborhood of (0.36, 0.28, 0.21). The combination of the turn-on duty ratio for each color which maximizes $\gamma_{max}$ is sometimes referred to as the optimum combination of the turn-on duty ratio for each color.

This indicates that the optimum combination of the turn-on duty ratio for each color (f×$t_R$, f×$t_G$, f×$t_B$) is present according to the ratio ($m_R$:$m_G$:$m_B$) of the power of the projected light beams in each color.

According to the first exemplary embodiment, processor 11 acquires the ratio ($m_R$:$m_G$:$m_B$) of the power of the projected light beams in each color using Formula 12 and Formula 13, determines the maximum value of $\gamma_{max}$ according to the ratio of the power, and determines the optimum combination of the turn-on duty ratio for each color (f×$t_R$, f×$t_G$, f×$t_B$) so that $\gamma_{max}$ is maximized. The upper limit value of the power of the projected light beam in each color which satisfies AEL of the color is determined by the maximum value of $\gamma_{max}$.

For example, processor 11 determines the optimum combination of the turn-on duty ratio for each color using Formula 14 for evaluation. Specifically, processor 11 calculates the turn-on duty ratio for each color so that the sum of the turn-on duty ratio for each color is to be a given value and so that the sum of the division of each value obtained by dividing the rate of the power of the laser beam in the corresponding color by the value of the power of the turn-on duty ratio of the laser beam is minimized. In Formula 14, for simplified expression, the turn-on duty ratio for each color (f×$t_R$, f×$t_G$, f×$t_B$) are expressed as ($d_R$, $d_G$, $d_B$).

[Formula 14]

$$\frac{m_R}{d_R^{0.75}} + \frac{m_G}{d_G^{0.75}} + \frac{m_B}{d_B^{0.75}} \qquad \text{formula 14}$$

Upon determining the optimum combination of the turn-on duty ratio for each color (f×$t_R$, f×$t_G$, f×$t_B$), processor 11 can determine the peak power of the projected light beams in each color ($P_{Rmax}$/(f×$t_R$), $P_{Gmax}$/(f×$t_G$), $P_{Bmax}$/(f×$t_B$)) according to the turn-on duty ratio for each color.

Hence, processor 11 divides the peak power of the projected light beams in each color ($P_{Rmax}$/(f×$t_R$), $P_{Gmax}$/(f×$t_G$), $P_{Bmax}$/(f×$t_B$)) by the light utilization efficiency of projector 10 to determine the lighting intensities of the laser beams. If the lighting intensity of the laser light exceeds the light intensity that can be emitted by lasers 1 to 3, processor 11 readjusts the lighting intensities of the laser beams in each color without changing the ratio of the power of the projected light beams in each color.

Now, operation of projector 10 according to a first exemplary embodiment will be described.

Figure 5:
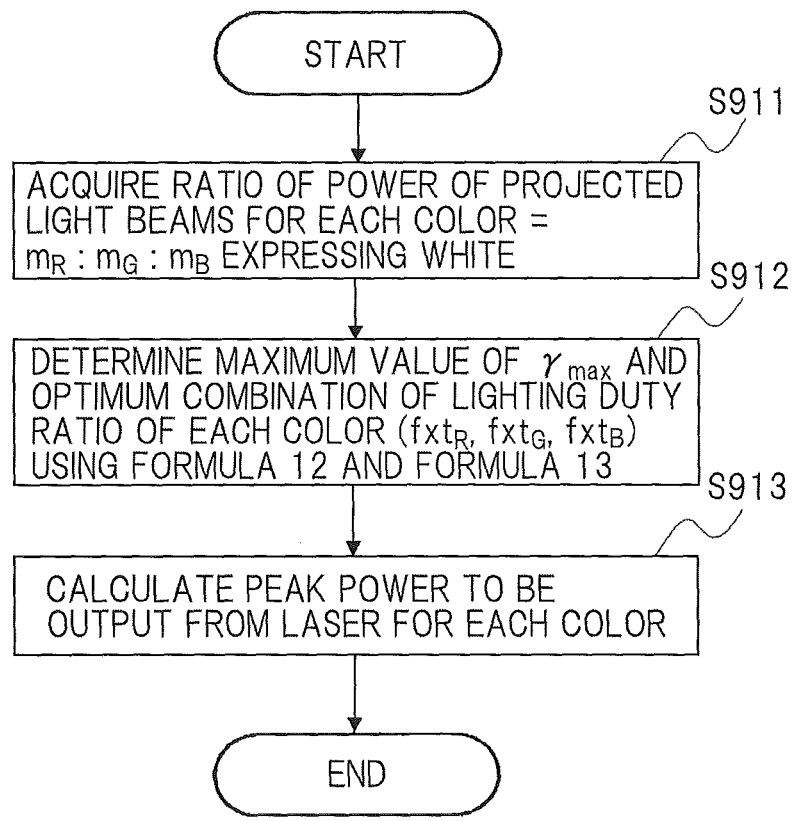
FIG. 5 is a flowchart showing an example of a process procedure for a method of controlling a light source.

FIG. 5 is a flowchart showing a process procedure for a method of controlling a light source. FIG. 5 assumes that processor 11 prestores, as AEL information, the chromaticity coordinates of lasers 1 to 3 for the respective lasers, ratio η of the accessible emission level to the power of the projected light, the light utilization efficiency between lasers 1 to 3 and the screen, and visual angle α of projector 10 (or correction coefficient $C_6$).

First, processor 11 acquires the ratio ($m_R$:$m_G$:$m_B$) of the power of projected light beams in each color to be projected (step S911).

Processor 11 determines the maximum value of $\gamma_{max}$ by using Formula 12 and Formula 13 to determine the upper limit value of the power of the projected light beam in each color to the extent that AEL is satisfied according to the ratio ($m_R$:$m_G$:$m_B$) of the power of projected light beams in each color, and determines the optimum combination of the turn-on duty ratio for each color (f×$t_R$, f×$t_G$, f×$t_B$) which sets $\gamma_{max}$ to the maximum value (step S912).

Processor 11 uses the optimum combination of the turn-on duty ratio for each color (f×$t_R$, f×$t_G$, f×$t_B$) to calculate the peak power of the laser beams emitted from lasers 1 to 3 for each color (step S913).

According to the first exemplary embodiment, projector 10 includes lasers 1 to 3 provided for each of a plurality of colors to emit laser beams in each color, dichroic mirror 5 that synthesizes the laser beams emitted by lasers 1 to 3 for each color, LCOS panel 8 that modulates the synthesized light resulting from the synthesis by dichroic mirror 5 according to an image signal, and projection lens 9 that projects the synthesized light modulated by LCOS panel 8. Upon receiving an image signal, processor 11 determines the ratio of the power of the laser beams in each color emitted by lasers 1 to 3 according the image signal, determines, according to the ratio of the power, the upper limit value of the power of the projected light beam in each color to the extent that the accessible emission level (AEL) is satisfied, and adjusts the laser beams emitted by lasers 1 to 3 so as to prevent the projected light beam in each color projected by the projection lens 9 from exceeding the upper limit value. The accessible emission limit AEL is the safety standard for laser light specified in IEC 60825-1.

Thus, upon receiving the image signal, projector 10 can control lasers 1 to 3 so as to prevent the laser beams emitted by lasers 1 to 3 for each color from exceeding accessible emission limit AEL. Hence, the first exemplary embodiment enables lasers 1 to 3 to be controlled according to the image signal while always satisfying the safety standard for laser light specified in IEC 60825-1.

Furthermore, according to the first exemplary embodiment, processor 11 uses the rate of the power of the laser beam in each color and the upper limit value for the color to calculate the turn-on time for the laser beam within the frame period, and divides the power of the laser beam by the turn-on time for the laser beam to calculate the lighting intensity (peak power) of the laser beam. Processor 11 allows each of lasers 1 to 3 for each color to emit a laser beam with the calculated lighting intensity for the calculated turn-on time.

Hence, projector 10 can control each of lasers 1 to 3 for each color so as to prevent the power of the laser beam from exceeding accessible emission limit AEL.

Furthermore, according to the first exemplary embodiment, processor 11 calculates the turn-on times for the laser beams in each color within the frame period so that the sum of the turn-on times for the laser beams in each color within the frame period is to be a given value and so that the sum of each of the division value obtained by dividing the rate of the power of the laser beam in the corresponding color by the value of the power of the turn-on time for the laser beam within the frame period is minimized.

Hence, projector 10 can maximize the power of the laser beam in each color to the extent that accessible emission limit AEL is satisfied. Thus, projector 10 can improve the brightness to the extent the safety standard for laser safety is satisfied.

Furthermore, according to the first exemplary embodiment, lasers 1 to 3 emit laser beams in each color at different timings. Processor 11 determines the value of the sum of the turn-on times for each color within the frame period and calculates the turn-on times for the laser beams in each color within the frame period so that the sum of the turn-on times within the frame period is to be a given value and so that the sum of each of division value obtained by dividing the rate of the power of the laser beam in the corresponding color by the value of the power of the turn-on time for the laser beam within the frame period is minimized.

Hence, projector 10 can maximize the power of the laser beam in each color to the extent that AEL is satisfied without changing the sum of the turn-on times for each color within the frame period.

Projector 10 may prestore predetermined time threshold values and predetermined intensity threshold values in a memory in processor 11. Processor 11 may calculate the turn-on time for the laser beam which is equal to or longer than the corresponding predetermined time threshold value and the lighting intensity of the laser beam which is equal to or lower than the corresponding predetermined intensity threshold value. Then, if DLP is used as an optical modulation element, the minimum required turn-on time can be provided to obtain a predetermined gray level. Furthermore, projector 10 can prevent instructions for turn-on times and lighting intensities that cannot be achieved by lasers 1 to 3 from being given to lasers 1 to 3 and thus adjust the laser beams according to the performance of lasers 1 to 3. Hence, projector 10 can set lasers 1 to 3 according to the specifications of lasers 1 to 3 while satisfying the safety standard for laser light.

Now, a projector according to a second exemplary embodiment will be described. The basic configuration of the second exemplary embodiment is similar to the basic configuration of the first exemplary embodiment.

The color of each pixel and the distribution of the number of pixels, based on brightness, vary according to an image formed of a plurality of pixels. Hence, the required power of the projected light beam in each color varies according to the color of each pixel and the distribution of the number of pixels based on brightness.

Thus, according to the second exemplary embodiment, processor 11 determines the color or brightness of an image according to the color of each pixel and the distribution of the number of pixels based on brightness. Processor 11 then increases or reduces the power of a laser beam in each color emitted by the corresponding one of lasers 1 to 3 according to the color or brightness of the image. For example, when a dark image is projected, processor 11 sets, according to the brightness of the image, the power of the laser beams emitted by lasers 1 to 3 to be lower than when a bright image is projected.

On the other hand, when the brightness is increased for an image in red or the like, processor 11 increases the power of the laser beam emitted by the laser in the particular color. However, operating conditions for lasers 1 to 3 for each color need to be appropriately set so as to allow the lasers to be classified as predetermined laser classes.

The operating conditions for lasers 1 to 3 can be determined as in the case with the first exemplary embodiment. Processor 11 adjusts the laser beam in each color by determining the ratio ($m_R$:$m_G$:$m_B$) of the power of the projected light beams in each color in each image shown in an image signal, and determining the optimum combination of the turn-on duty ratio for each color ($f \times t_R$, $f \times t_G$, $f \times t_B$) which maximizes the value of $\gamma_{max}$. Thus, the peak power of lasers 1 to 3 for each color is determined according to the brightness of the image. The upper limit of the brightness of projector 10 is calculated in accordance with Formula 13.

Figure 6:
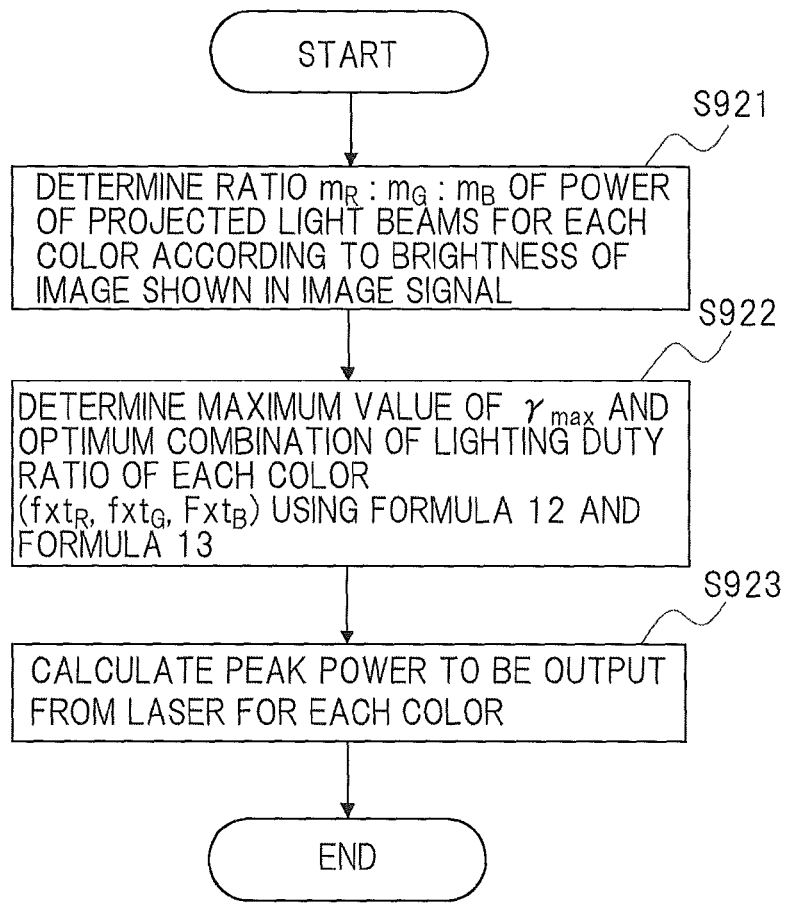
FIG. 6 is a flowchart showing a method of controlling a light source according to a second exemplary embodiment.

FIG. 6 is a flowchart showing a method for controlling a light source according to the second exemplary embodiment. FIG. 6 assumes that processor 11 prestores the chromaticity coordinates of lasers 1 to 3 for each color, ratio η of the accessible emission level to the power of the projected light, the light utilization efficiency between lasers 1 to 3 and the screen, and visual angle α of projector 10.

Upon receiving an image signal, processor 11 determines the ratio ($m_R$:$m_G$:$m_B$) of the power of projected light beams in each color according to the brightness of each image shown in the image signal (step S921). The ratio ($m_R$:$m_G$:$m_B$) of the power of the projected light beams in each color refers to the ratio of power of the projected light beams obtained when LCOS panel 8 is kept on throughout the period. This state is expected to be the most critical condition under which the power of the projected light beams in each color is maximized.

For example, processor 11 calculates the ratio ($m_R$:$m_G$:$m_B$) of the power of the projected light beams in each color based on the maximum value of the brightness shown in the image signal in each color. Alternatively, in connection with the brightness of each pixel shown in the image signal in each color, processor 11 may use the brightness of pixels corresponding to the top 10% of all the pixels to calculate the ratio ($m_R$:$m_G$:$m_B$) of the power of the projected light beams in each color.

Processor 11 uses the ratio ($m_R$:$m_G$:$m_B$) of the power of the projected light beams in each color to determine the maximum value of $\gamma_{max}$ and the optimum combination of the turn-on duty ratio for each color ($f \times t_R$, $f \times t_G$, $f \times t_B$) (step S922).

Subsequently, processor 11 uses the optimum combination of the turn-on duty ratio for each color ($f \times t_R$, $f \times t_G$, $f \times t_B$) to calculate the peak power of the laser beam in each color (step S923). That is, processor 11 calculates the peak power of the laser beam in each color based on the brightness of the color in the image shown in the image signal. For example, processor 11 associates the maximum value of $\gamma_{max}$ with the maximum value of the brightness of each pixel shown in the image signal, and calculates the peak power according to the brightness of the pixel shown in the image signal.

The maximum value of $\gamma_{max}$ and the optimum combination of the turn-on duty ratio for each color ($f \times t_R$, $f \times t_G$, $f \times t_B$) are uniquely determined for each ratio ($m_R$:$m_G$:$m_B$) of the power of the projected light beams in each color. Hence, processor 11 may prestore a correspondence table in which the ratio ($m_R$:$m_G$:$m_B$) of the power of the projected light beams in each color is associated with the optimum combination of the turn-on duty ratio for each color. Every time the ratio ($m_R$:$m_G$:$m_B$) of the power of the projected light beams in each color is determined, processor 11 references the correspondence table to determine the optimum combination of the turn-on duty ratio for each color, thus determining the peak power of the laser beam in each color.

According to the second exemplary embodiment, processor 11 determines the brightness of each image shown in the image signal based on the distribution of the brightness of the pixels shown in the image signal. Processor 11 then determines the ratio of the power of the laser beams in each color according to the brightness of the image. Processor 11 then determines the upper limit value of the power of the projected light beam in each color to the extent that AEL is satisfied, according to the ratio of the power of the laser beams in each color. Processor 11 further uses the rate of the power of the laser beam in each color and the upper limit value for the color to calculate the turn-on duty ratio for the color and the peak power of the laser beam in the color.

Hence, the projector according to the second exemplary embodiment allows lasers 1 to 3 to emit laser beams with the minimum power needed for each image shown in the image signal. Thus, the projector can always satisfy accessible emission limit AEL, while reducing the power consumption of lasers 1 to 3 for each color.

Moreover, even if a particular color projected on the screen is made brighter, the turn-on duty ratio for each color which satisfy Formula 13 can be calculated to allow the power of the laser beam in each color to be adjusted so as not to exceed AEL for a predetermined laser class. Thus, the projector can control lasers 1 to 3 for each color according to the image signal while always satisfying accessible emission limit AEL.

Now, a projector according to a third exemplary embodiment will be described. The basic configuration of the third exemplary embodiment is similar to the basic configurations of the first and second exemplary embodiments.

The third exemplary embodiment simultaneously turns on lasers 1 to 3 for each color in order to increase the power of projected light beams. Like the first exemplary embodiment, the third exemplary embodiment assumes the ratio ($m_R$:$m_G$:$m_B$) of the power of the projected light beams in each color which expresses white (x, y)=(0.3127, 0.3290) to be (0.473:0.310:0.217). The third exemplary embodiment also assumes correction coefficient $C_6$ to be "26.3".

Figure 7:
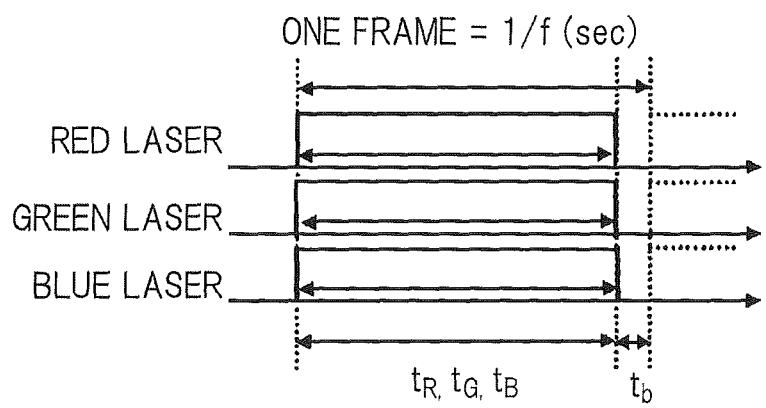

FIG. 7 is a diagram showing a period during which lasers 1 to 3 for each color are simultaneously turned on. Blanking time $t_b$ is "0.15". As shown in FIG. 7, all the pixels projected on the screen are in white, and lasers 1 to 3 for each color are simultaneously turned on.

As shown in FIG. 7, the turn-on duty ratio of lasers 1 to 3 for each color are all equal, $f \times t_R = f \times t_G = f \times t_B$. Hence, since the turn-on duty ratio for each color are equal, AELs of each color in Formula 12 are all equal.

Furthermore, processor 11 calculates the maximum value of $\gamma_{max}$ to be 23.0 mW using Formula 13. The maximum value of 23.0 mW for $\gamma_{max}$ corresponds to power about 2.3 times as high as the power provided by the maximum value of 10.3 mW for $\gamma_{max}$ according to the first exemplary embodiment. This is because an increase in the duty ratio for each color increases AEL and the maximum value of $\gamma_{max}$ which are calculated in accordance with Formula 12 and Formula 13.

However, the turn-on conditions for lasers 1 to 3 shown in FIG. 7 allow for the reproduction of only images that each include all pixels that have the same color. Thus, an example will be described in which the frame period includes a period during which lasers 1 to 3 for each color are separately turned on and a period during which lasers 1 to 3 for each color are simultaneously turned on.

Figure 8:
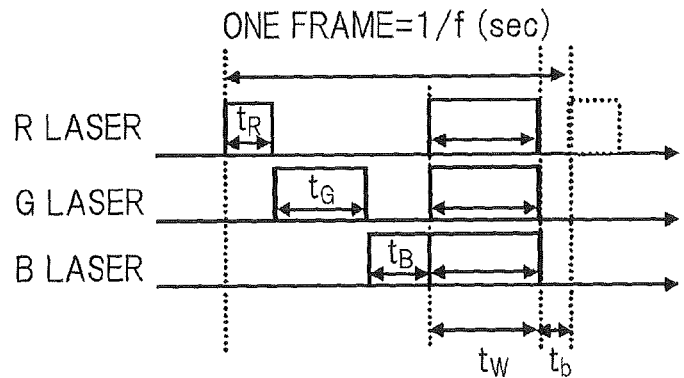

FIG. 8 is a diagram showing turn-on timings for independently turning on each of lasers 1 to 3 for each color and for simultaneously turning on lasers 1 to 3. FIG. 8 shows turn-on time $t_R$ during which only red laser 1 is turned on, turn-on time $t_G$ during which only green laser 2 is turned on, turn-on time $t_B$ during which only blue laser 3 is turned on, simultaneous turn-on time $t_W$, and blanking time $t_b$ which are all included in one frame (1/f). The simultaneous turn-on time is also referred to as the particular time.

As shown in FIG. 8, each of lasers 1 to 3 emits a laser beam along with the other lasers only during the simultaneous turn-on time within the turn-on time. Hence each of lasers 1 to 3 is turned on twice within one frame period. Thus, $AEL_{s.t.train}$, one of the three types AELs, is calculated using a total on time pulse (TOTP) scheme expressed by Formula 15.

[Formula 15]

$$AEL_{s.p.train} = 7 \times 10^{-4} t_{TOTP}^{0.75} C_6 [J] \quad \text{formula 15}$$

In Formula 15, $t_{TOTP}$ denotes the total of the turn-on times (pulse widths) of the light sources within the time reference of 0.25 s specified for laser class 2. The total $t_{TOTP}$ of the turn-on times of lasers 1 to 3 for the respective lasers is expressed by:

[Formula 16]

$$t_{TOTP,R} = 0.25 \cdot f \cdot (t_R + t_W)$$

$$t_{TOTP,G} = 0.25 \cdot f \cdot (t_G + t_W)$$

$$t_{TOTP,B} = 0.25 \cdot f \cdot (t_B + t_W) \quad \text{formula 16}$$

Formula 15 represents energy per time reference of 0.25 s. Thus, when Formula 16 is substituted into $AEL_{s.p.train,i}$, which is an average power equivalent, Formula 15 is expressed by:

[Formula 17]

$$AEL_{s.p.train,i} = C_6 \cdot 0.99 \times 10^{-3} \cdot (f \cdot (t_i + t_W))^{0.75} [W] \quad \text{formula 17}$$

In Formula 17, i=R, G, B. Furthermore, the expression in parentheses represents the rate of the turn-on times for lasers 1 to 3 for each color within one frame period, that is, the sum of the turn-on duty ratio for each color within one frame period.

A comparison between Formula 17 and Formula 9 indicates that $AEL_{s.p.train,i}$ is smaller than $AEL_{s.p.T}$ because the turn-on duty ratio do not exceed 1. Thus, $AEL_{s.p.train,i}$ in Formula 17 is used to determine the laser class.

Thus, $AEL_R$, $AEL_G$, and $AEL_B$, used to determine the laser class, are expressed by:

[Formula 18]

$$AEL_R = C_6 \cdot 0.99 \times 10^{-3} \cdot (f \cdot (t_R + t_W))^{0.75} [W]$$

$$AEL_G = C_6 \cdot 0.99 \times 10^{-3} \cdot (f \cdot (t_G + t_W))^{0.75} [W]$$

$$AEL_B = C_6 \cdot 0.99 \times 10^{-3} \cdot (f \cdot (t_B + t_W))^{0.75} [W] \quad \text{formula 18}$$

Formula 18 indicates that AEL of each color varies depending on the turn-on duty ratio of the color. Now, $\gamma_{max}$ that corresponds to the turn-on duty ratio for each color is determined using Formula 18. When the ratio of the power of the projected light beams in each color is denoted by $m_R$:$m_G$:$m_B$, Formula 13 is used as an evaluation formula for the determination of the laser class.

Figure 9:
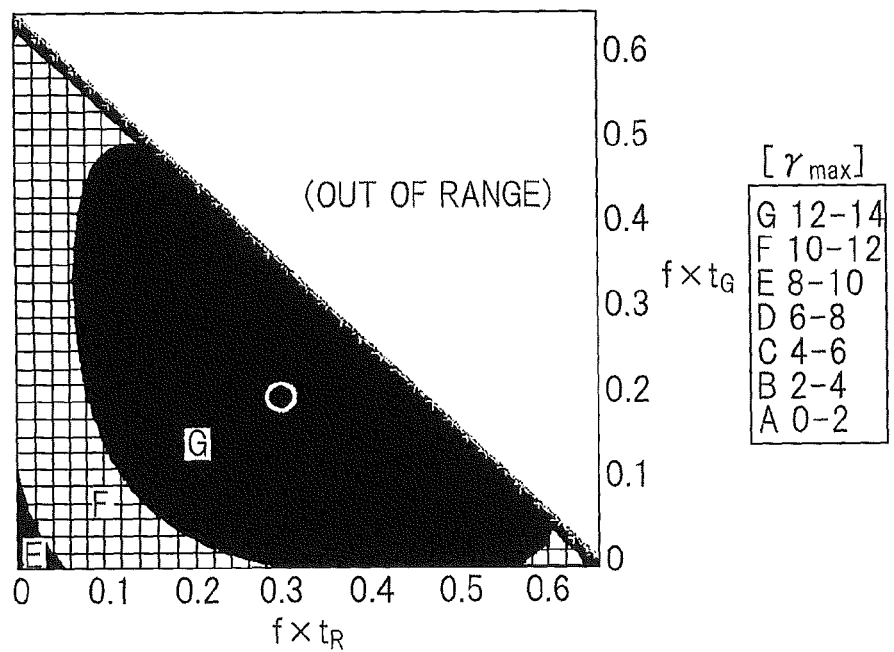
FIG. 9 is a diagram showing $\gamma_{max}$ that varies depending on the turn-on duty ratio according to a third exemplary embodiment.

FIG. 9 is a diagram showing $\gamma_{max}$ that corresponds to the turn-on duty ratio according to the third exemplary embodiment. In FIG. 9, it is assumed that the ratio ($m_R$:$m_G$:$m_B$) of the power of projected light beams in each color which expresses white is to be (0.473:0.310:0.217). The turn-on duty ratio of the simultaneous turn-on time (white segment) is "0.2".

FIG. 9 shows that $\gamma_{max}$ has a maximum value of 13.8 mW when the combination of the turn-on duty ratio for each color ($f \times t_R$, $f \times t_G$, $f \times t_B$) is in the neighborhood of (0.30, 0.20, 0.15). Hence, even for a projector in which lasers 1 to 3 for each color are simultaneously turned on, the optimum combination of the turn-on duty ratio for each color can be determined. Changing the value of the turn-on duty ratio ($f \times t_W$) of the simultaneous turn-on time changes the optimum combination of the turn-on duty ratio for each color.

Figure 10:
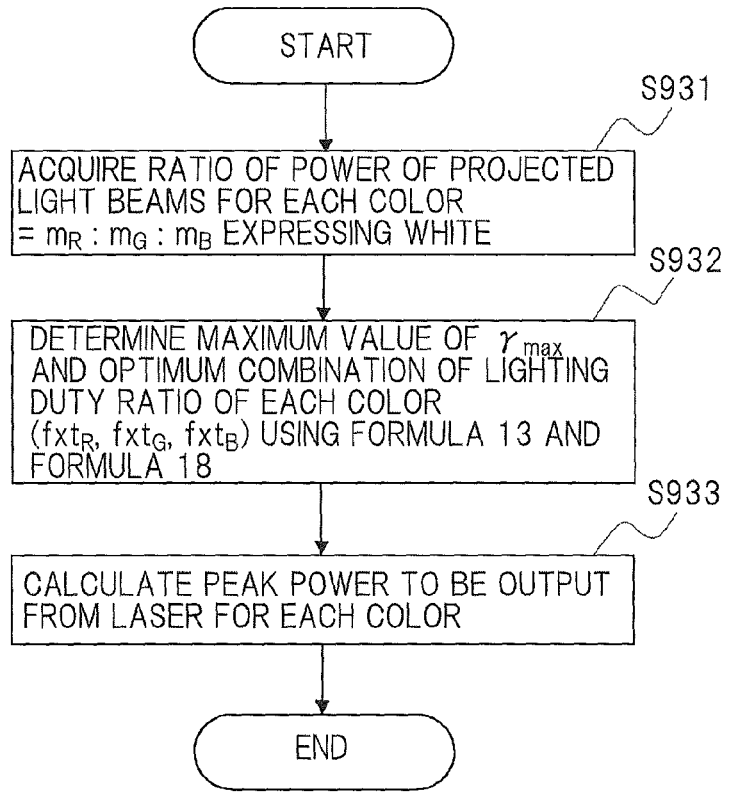
FIG. 10 is a flowchart showing a method of controlling a light source according to a third exemplary embodiment.

FIG. 10 is a flowchart showing a method of controlling a light source according to the third exemplary embodiment.

FIG. 10 assumes that processor 11 prestores parameters needed to determine the laser class. The turn-on duty ratio ($f \times t_W$) is optionally set.

First, processor 11 acquires the ratio ($m_R:m_G:m_B$) of the power of projected light beams in each color to be projected (step S931).

Processor 11 then determines the maximum value of $\gamma_{max}$ and the optimum combination of the turn-on duty ratio for each color ($f \times t_R$, $f \times t_G$, $f \times t_B$) according to the ratio ($m_R:m_G:m_B$) of the power of the projected light beams in each color, using Formula 13 and Formula 18 (step S932).

Processor 11 uses the optimum combination of the turn-on duty ratio for each color ($f \times t_R$, $f \times t_G$, $f \times t_B$) to calculate the peak power of the laser beams emitted by lasers 1 to 3 for each color (step S933).

According to the third exemplary embodiment, each of lasers 1 to 3 emits a laser beam simultaneously with the other lasers only during the simultaneous turn-on time (particular time) within the turn-on time.

Hence, the maximum value of $\gamma_{max}$ according to the third exemplary embodiment is larger than the maximum value of $\gamma_{max}$ according to the first exemplary embodiment. Thus, compared to the first exemplary embodiment, the third exemplary embodiment can maximize the power of the projected light beam for a particular laser class.

The optimum operating conditions for lasers 1 to 3 which satisfy Formula 13 can be determined in spite of a change in the combination of lasers to be simultaneously turned on and a change in the ratio ($m_R:m_G:m_B$) of the power of the projected light beams in each color. Furthermore, lasers 1 to 3 for each color may be controlled for each image shown in the image signal as in the case with the second exemplary embodiment.

A projector according to a fourth embodiment will be described. The basic configuration of the fourth exemplary embodiment is similar to the basic configurations of the first to third exemplary embodiments.

Green lasers mainly use SHG (Second Harmonic Generation). However, green lasers with a size of 1 to 2 cc and a watt (W) class output are not yet commercially available. Furthermore, green laser diodes formed of InGaN have been studied, but the current green laser diodes have a maximum output of about 50 mW.

Thus, as a small, high-output green light source, a light source using a phosphor instead of laser light has been proposed. In a green light source using a phosphor, the phosphor is excited by a blue laser or the like to emit a green fluorescence.

Thus, the projector according to the fourth embodiment includes a green light source using a phosphor instead of green laser 2. The green light source using the phosphor may generally be referred to as a predetermined light source.

A green fluorescence is less coherent and has a wider spectrum than laser light. Thus, in the determination of the laser class, those terms of Formula 13 which correspond to the green laser beam are excluded. Thus, Formula 13 is expressed by:

[Formula 19]

$$\frac{E_R}{AEL_R} + \frac{E_B}{AEL_B} = \left(\frac{m_R}{AEL_R} + \frac{m_B}{AEL_B}\right) \cdot \gamma < 1 \quad \text{formula 19}$$

Formula 19 indicates that the use of the phosphor increases the accessible emission limits for red and blue laser beams.

Hence, compared to a projector using green laser 2, the projector according to the fourth exemplary embodiment enables an increase in the power of laser beams emitted by red laser 1 and blue laser 3.

The fourth exemplary embodiment assumes the red and blue laser beams to have wavelengths of 640 nm and 445 nm, respectively. The fourth exemplary embodiment also assumes the chromaticity coordinates (x, y) of the green fluorescence to be (0.30, 0.60) and assumes the luminosity factor of the green fluorescence to be 400 lm/W. Hence, the ratio ($m_R:m_G:m_B$) of the power of projected light beams in each color which expresses white is (0.270:0.526:0.204).

Furthermore, $AEL_R$ and $AEL_B$ of the red and blue laser beams are the same as $AEL_R$ and $AEL_B$ in Formula 12 and are thus expressed by Formula 20 that corresponds to Formula 12 from which $AEL_G$ of the green laser beam is excluded.

[Formula 20]

$$AEL_R = C_6 \cdot 0.99 \times 10^{-3} \cdot (f \cdot t_R)^{0.75} [W]$$

$$AEL_B = C_6 \cdot 0.99 \times 10^{-3} \cdot (f \cdot t_B)^{0.75} [W] \quad \text{formula 20}$$

Hence, the fourth exemplary embodiment also allows determination of $\gamma_{max}$ that sets the left side of Formula 19 to "1".

Figure 11:
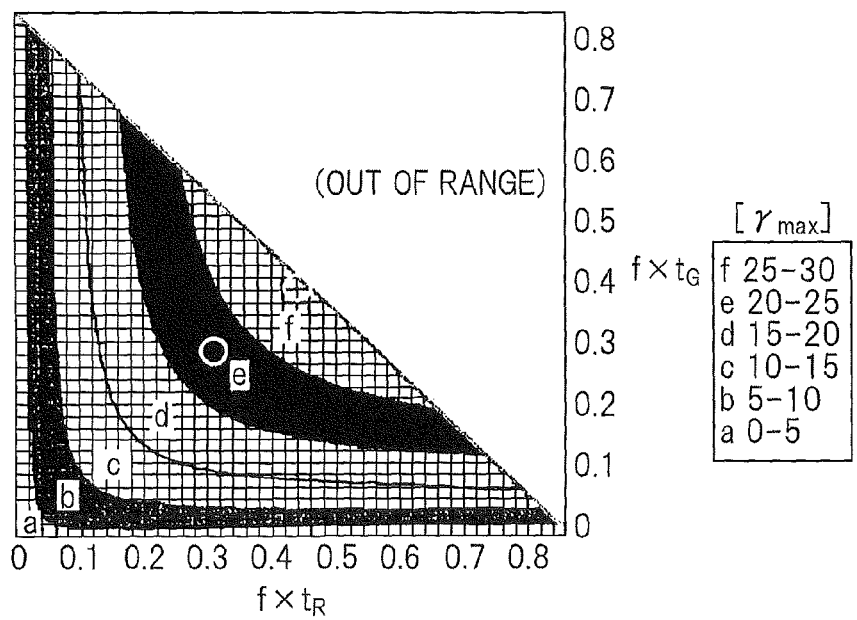
FIG. 11 is a diagram showing $\gamma_{max}$ that varies depending on the turn-on duty ratio of red and blue.

FIG. 11 is a diagram showing $\gamma_{max}$ that corresponds to the turn-on duty ratio for red and blue. In FIG. 11, the sum of the turn-on duty ratio for red and blue ($f \times t_R + f \times t_B$) is smaller than "0.85".

FIG. 11 shows that the maximum value of $\gamma_{max}$ is in the neighborhood of $f \times t_R = f \times t_B = 0.42$, and $\gamma_{max}$ is 28.7 mW when $f \times t_R = f \times t_B = 0.42$. In this case, the turn-on duty ratio for green ($f \times t_G$) is about 0.01, which is not a practical value for the turn-on duty ratio.

Thus, when the turn-on duty ratio for green ($f \times t_G$) is assumed to be 0.20, $\gamma_{max}$ has a maximum value of 23.4 mW in the neighborhood of ($f \times t_R$, $f \times t_B$)=(0.32, 0.32). The maximum value of 23.4 mW for $\gamma_{max}$ can be converted into a projected flux equivalent to 5.75 lm. On the other hand, according to the first exemplary embodiment, the maximum value of $\gamma_{max}$ is 10.3 mW and can be converted into a projected flux equivalent to 2.50 lm.

Thus, a projector that uses the green phosphor to set the turn-on duty ratio for each color ($f \times t_R$, $f \times t_G$, $f \times t_B$) to (0.32, 0.20, 0.32) can make the projection screen about 2.3 times brighter than projector 10 according to the first exemplary embodiment.

As shown in FIG. 11, the value of $\gamma_{max}$ increases as ($f \times t_R$) and ($f \times t_B$) approach "0.42". In other words, the value of $\gamma_{max}$ increases with decreasing turn-on duty ratio for green ($f \times t_G$). Thus, compared to the first exemplary embodiment, the fourth exemplary embodiment enables an increase in the power of the projected light for the same laser class. The minimum value of the turn-on duty ratio for green is determined by the number of gray levels for green and the peak intensity of the green fluorescence.

Figure 12:
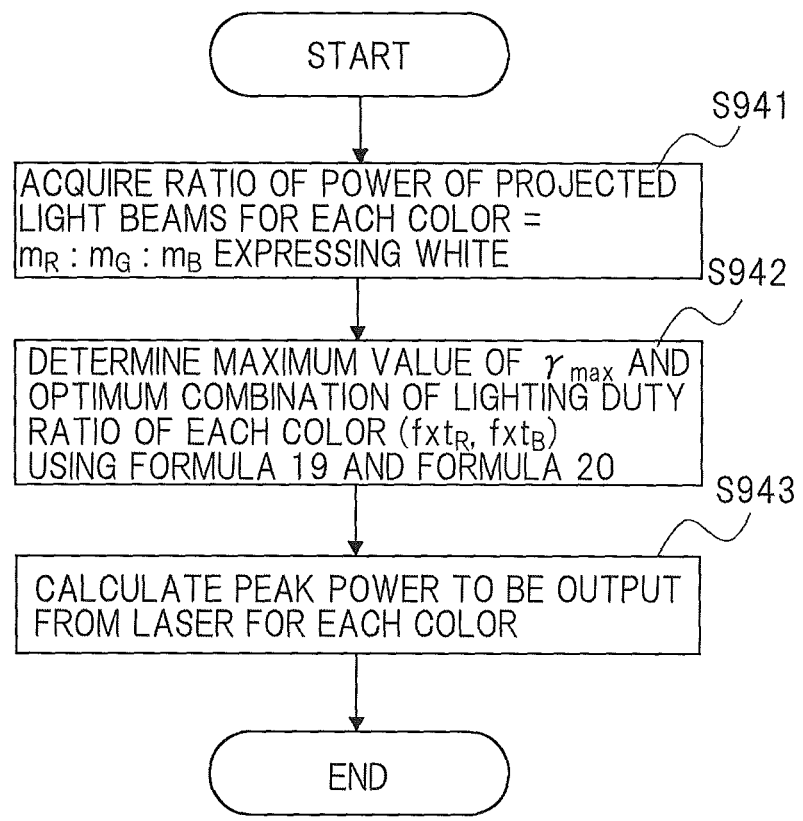
FIG. 12 is a flowchart showing a method of controlling a light source according to a fourth exemplary embodiment.

FIG. 12 is a flowchart showing a method of controlling a light source according to the fourth exemplary embodiment. Processor 11 prestores parameters needed to determine the laser class. The turn-on duty ratio for green fluorescence ($f \times t_G$) is preset.

First, processor 11 acquires the ratio ($m_R:m_G:m_B$) of the power of projected light beams in each color to be projected (step S941).

Processor 11 then determines the maximum value of $\gamma_{max}$ and the optimum combination of the turn-on duty ratio for red and blue ($f \times t_R$ and $f \times t_B$) according to the ratio ($m_R:m_G:m_B$) of the power of the light beams in each color, using Formula 19 and Formula 20 (step S942).

Processor 11 uses the turn-on duty ratio for red and blue ($f \times t_R$ and $f \times t_B$) to calculate the peak power (lighting intensity) of the laser beams emitted by red laser 1 and blue laser 3 (step S943).

According to the fourth exemplary embodiment, the projector includes red laser 1, blue laser 3, and the green light source that emits a green fluorescence. Processor 11 determines the value of the sum of the turn-on times for the laser beams in each color other than the fluorescence emitted by the green light source, and calculates the turn-on times for each color so that the value of the sum of the turn-on times is to be a given value and so that the sum of division values for each color obtained by using Formula 14 is minimized.

Thus, the projector according to the fourth exemplary embodiment uses the green light source instead of green laser 2 to enable an increase in the power of the red and blue laser beams compared to the projectors according to the first to third exemplary embodiments. Hence, compared to the first to third exemplary embodiments, the fourth exemplary embodiment enables an increase in the brightness of the projector.

Furthermore, the fourth exemplary embodiment may determine the ratio of the power of the projected light beams in each color for each image similar, to the second exemplary embodiment and may simultaneously turn on the light beams in each color similar to the third exemplary embodiment.

Additionally, the fourth exemplary embodiment has been described in conjunction with the example using a light source that emits a green fluorescence. However, for example, a light source that emits a red fluorescence may be used instead of red laser 1. Alternatively, a LED (light Emitting Diode) may be used instead of the laser. Light emitted by the LED is not laser light, and thus, the projector according to the fourth exemplary embodiment can make the projection screen brighter than the projectors according to the first to third exemplary embodiments.

The exemplary embodiments have been described in conjunction with the example in which projector 10 is brought into compliance with the provision for the laser class 2. However, a technique similar to the technique may be used to bring projector 10 into compliance with the provision for another laser class.

In the above-described exemplary embodiments, the illustrated configurations are only examples, and the present invention is not limited to the configurations.

REFERENCE SIGNS LIST

1 Red laser
2 Green laser
3 Blue laser
4 Cross prism
5 Dichroic mirror
6 Optical element
7 Polarizing beam splitter
8 LCOS panel
9 Projection lens
10 Projector
11 Processor

What is claimed is:

1. An image projection apparatus comprising:
light sources provided for each of a plurality of colors to emit a laser beam in each color;
a synthesis element that synthesizes laser beams in each color emitted by said light sources for each color;
an optical modulation element that modulates synthesized light resulting from the synthesis by said syntheses element according to an image signal;
a projection lens that projects the synthesized light modulated by said optical modulation element; and
a controller that, upon receiving the image signal, determines rate of power of the laser beams in each color emitted by said light sources for each color, according to the image signal, determines, according to the rate of the power, an upper limit value of the power of the projected laser beam in each color to the extent that the upper limit value satisfies a safety standard for the laser beam, and adjusts the laser beam in each color emitted by said corresponding light source so as to prevent the projected light beam in each color projected by said projection lens from exceeding the upper limit value,
wherein said controller uses the rate of the power of the laser beam in each color and the upper limit value to calculate a turn-on time for the laser beam within a predetermined period, divided the power of the laser beam by the turn-on time for the laser beam to calculate a lighting intensity of the laser beam, and controls said corresponding light source in such a manner that said light source emits a laser beam of the lighting intensity for the turn-on time within the predetermined period.

2. The image projection apparatus according to claim 1, wherein said controller calculates the turn-on time for each color within the predetermined period so that a sum of the turn-on times for each color within the predetermined period is to be a given value and so that a sum of each of division value obtained by dividing a rate of the power of the laser beam in the corresponding color by a value of a power of the turn-on time for the laser beam is minimized.

3. The image projection apparatus according to claim 1, wherein said controller determines the rate of the power of the laser beam in each color according to a brightness of an image shown in the image signal, and determines, according to the rate of the power, the upper limit value of the power of a projected light beam in each color to the extent that the safety standard for the laser beam is satisfied.

4. The image projection apparatus according to claim 2, wherein each of said light sources emits the laser beams at different timings, and
said controller determines the value of the sum of the turn-on times for each color within the predetermined period, and calculates the turn-on times for each color within the predetermined period so that the sum of the division values for each color is minimized.

5. The image projection apparatus according to claim 2, wherein each of said light sources emits the laser beams simultaneously with other light sources for a particular time within the turn-on time.

6. The image projection apparatus according to claim 3, further comprising a predetermined light source that emits light that is not the laser beams, and
said controller determines a value of a sum of the turn-on times, within the predetermined period, of the laser beams in each color other than the light emitted by said predetermined light source, and calculates the turn-on times for each color within the predetermined period so that the sum of the division values for each color is minimized.

7. The image projection apparatus according to claim 1, wherein said controller stores a predetermined time threshold value and a predetermined intensity threshold value, calculates the turn-on time to be equal to or longer than the predetermined time threshold value, and calculates the lighting intensity to be equal to or lower than the predetermined intensity threshold value.

8. A method of controlling a light source for an image projection apparatus comprising light sources provided for each of a plurality of colors to emit a laser beam in each color, a synthesis element that synthesizes laser beams in each color emitted by said light sources for each color, an optical modulation element that modulates synthesized light resulting from the synthesis by said synthesis element according to an image signal, and a projection lens that projects the synthesized light modulated by said optical modulation element, the method comprising:

upon receiving the image signal, determining rate of power of laser beams in each color emitted by said light sources for each color, according to the image signal, determining, according to the rate of the power, an upper limit value of the power of the projected laser beam in each color to the extent that the upper limit value satisfies a safety standard for the laser beam, and adjusting the laser beam in each color emitted by said light source so as to prevent the projected light beam in each color projected by said projection lens from exceeding the upper limit value, wherein adjusting the laser beam comprises:

using the rate of the power of the laser beam in each color and the upper limit value to calculate a turn-on time for the laser beam within a predetermined period, dividing the power of the laser beam by the turn-on time for the laser beam to calculate a lighting intensity of the laser beam, and controlling said corresponding light source in such a manner that said light source emits a laser beam of the lighting intensity for the turn-on time within the predetermined period.

* * * * *